US012717140B2

(12) United States Patent
Miyao et al.

(10) Patent No.: US 12,717,140 B2
(45) Date of Patent: Aug. 25, 2026

(54) OPTICAL MEMBER, VIRTUAL IMAGE DISPLAY DEVICE, AND MEASUREMENT METHOD FOR OPTICAL MEMBER

(71) Applicant: SEIKO EPSON CORPORATION, Tokyo (JP)

(72) Inventors: Toshiaki Miyao, Chino (JP); Toshiyuki Noguchi, Shiojiri (JP); Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 824 days.

(21) Appl. No.: 17/961,383

(22) Filed: Oct. 6, 2022

(65) Prior Publication Data

US 2023/0111091 A1 Apr. 13, 2023

(30) Foreign Application Priority Data

Oct. 7, 2021 (JP) ................................ 2021-165344

(51) Int. Cl.
*G02B 27/01* (2006.01)

(52) U.S. Cl.
CPC .. *G02B 27/0172* (2013.01); *G02B 2027/0178* (2013.01); *G02B 2027/0198* (2013.01)

(58) Field of Classification Search
CPC ........ G02B 27/0172; G02B 2027/0178; G02B 2027/0198
See application file for complete search history.

(56) References Cited

U.S. PATENT DOCUMENTS 6,337,773 B1 * 1/2002 Kawano ............ G02B 17/0848 359/642
2007/0103604 A1 5/2007 Yoshikawa et al.
2014/0139403 A1 * 5/2014 Hiraide ............ G02B 27/0176 359/630
2020/0073028 A1 * 3/2020 Shigemitsu ............ G02B 5/04

FOREIGN PATENT DOCUMENTS

JP H11-14906 A 1/1999
JP H11-211428 A 8/1999
JP 2007-127865 A 5/2007
JP 2007155628 A * 6/2007
JP 2014-160111 A 9/2014

OTHER PUBLICATIONS

"Esco Designer | Lens." Escooptics.com, 2016, calc.escooptics.com/lens?calc=lens-wedge. (Year: 2016).*

* cited by examiner

*Primary Examiner* — Ricky L Mack
*Assistant Examiner* — Natasha Nigam
(74) *Attorney, Agent, or Firm* — Oliff PLC

(57) ABSTRACT

An optical member includes a plurality of optically effective surfaces, and a plurality of measurement reference members that are associated with the plurality of optically effective surfaces and each of which serves as a reference for positioning of the plurality of optically effective surfaces. In this case, a relative positional relationship of the optically effective surfaces can be determined, and the optical performance of the optical member can be accurately evaluated.

11 Claims, 13 Drawing Sheets

O2
RL21
RS22(RL22)
210
17
z2
12a
y2
x2
RS21
(RL23)
11
X1
Da
RS23
SS
SS
12b
11a
X3
OE1
Db
RS12(RL12)
F1
y1
z1
F2
RL11
O1
x1
11b
(MR)
16
RS13
RS11(RL13)
OE2
12
OE3
11
11
SS
11c
X2
12b
12a
Dc

OPTICAL MEMBER, VIRTUAL IMAGE DISPLAY DEVICE, AND MEASUREMENT METHOD FOR OPTICAL MEMBER

The present application is based on, and claims priority from JP Application Serial Number 2021-165344, filed Oct. 7, 2021, the disclosure of which is hereby incorporated by reference herein in its entirety.

BACKGROUND

1. Technical Field

This disclosure relates to an optical member incorporated into a head-mounted display device or the like, a virtual image display device incorporating the optical member, and a measurement method for the optical member.

2. Related Art

A technique for an imaging optical system incorporated into a display device, or the like in which an optical member constituting the imaging optical system, specifically a lens having a free-form surface, is provided with an edge having a cylindrical piece shape and a horizontal reference plane, the edge defining the center of the lens and a plane perpendicular to the optical axis and the horizontal reference plane defining a horizontal plane, and the edge and the horizontal reference plane being used to enable the lens to be measured and attached to a lens barrel has been disclosed (JP-A-2007-127865).

In measurement of the shape of an optical component, in particular, when evaluating an optical component having a special optical surface such as a free-form surface, measurement data of surface accuracy is acquired using a contact-type or non-contact-type measurement device, and dimension data of each part based on a datum reference is acquired using a tool microscope, or the like. However, a position and an inclination of an optical surface are not integrated with the dimension data described above, and are mostly determined by matching model data with measurement data in general.

While such an imaging optical system incorporated into a head-mounted virtual image display device is required to have a higher angle of view and a higher definition, it is required to be smaller and lighter in order to make it easier to wear. There is a limitation on the number of lenses that can be used to achieve high optical performance and miniaturization, and the optical components constituting the virtual image display device are also required to adopt a complex shape, such as using many free-form surfaces, and further, it is necessary to incorporate an optical component such as a wedge lens having different axes for incidence and emission. When the above-described method of matching model data with measurement data is applied to such an optical component for a virtual image display device, it becomes difficult to accurately obtain a relative inclination and positional relationship between a plurality of surfaces. Further, such a non-contact-type measurement device described above has a limitation on the inclination that the device can measure, and is not able to measure a surface if its target inclination is steep, and thus a relative positional relationship of a plurality of optical surfaces is often not measured.

SUMMARY

An optical member according to one aspect of this disclosure includes a plurality of optically effective surfaces, and a plurality of measurement reference members that are associated with the plurality of optically effective surfaces and each of which serves as a reference for positioning of the plurality of optically effective surfaces.

DESCRIPTION OF EXEMPLARY EMBODIMENTS

An embodiment of an optical member and a virtual image display device according to this disclosure will be described below with reference to the accompanying drawings.

Figure 1:
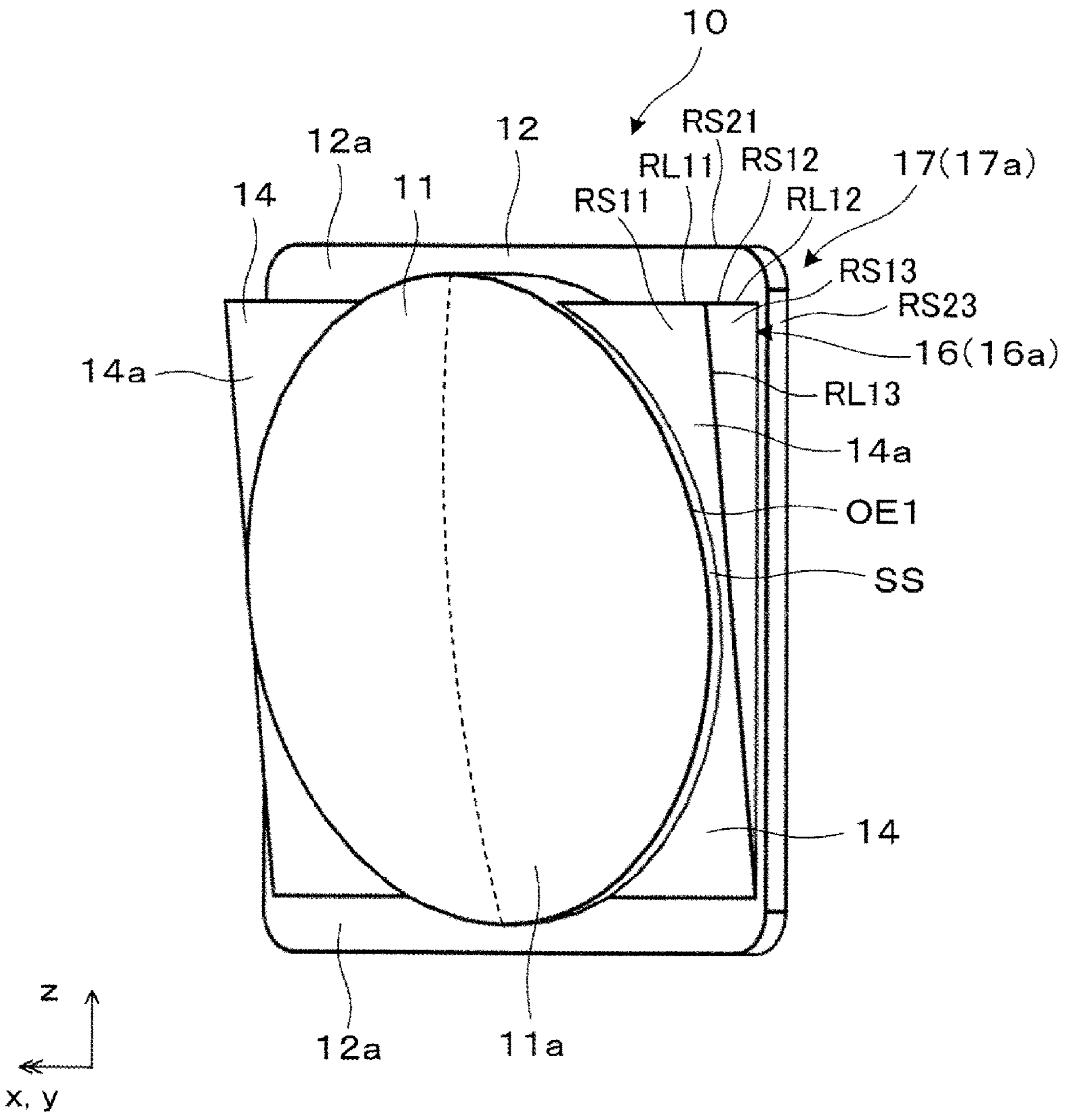
FIG. 1 is a perspective view for describing an optical member.
Figure 2:
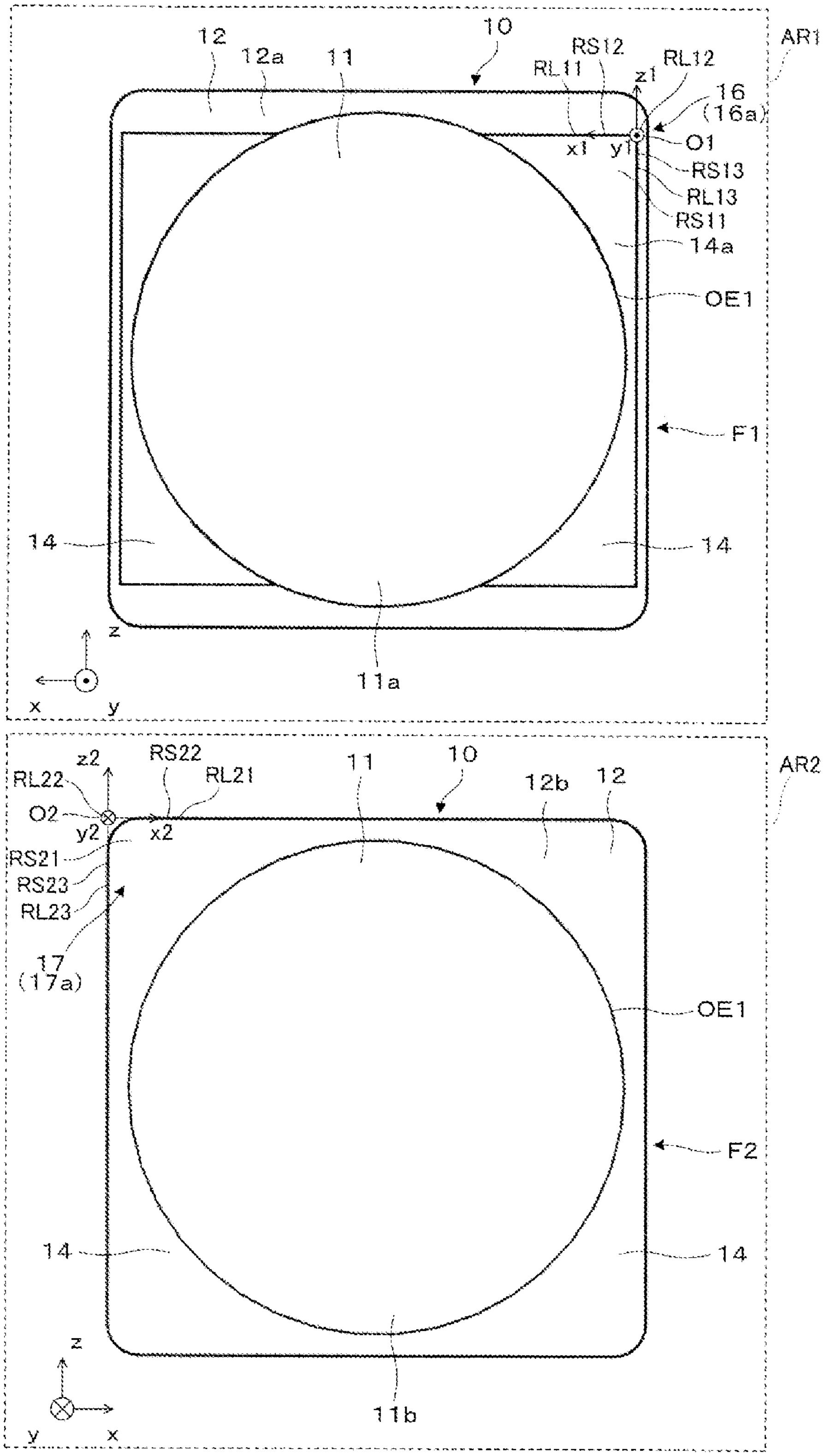
FIG. 2 is a diagram for describing a pair of main surfaces of the optical member.
Figure 3:
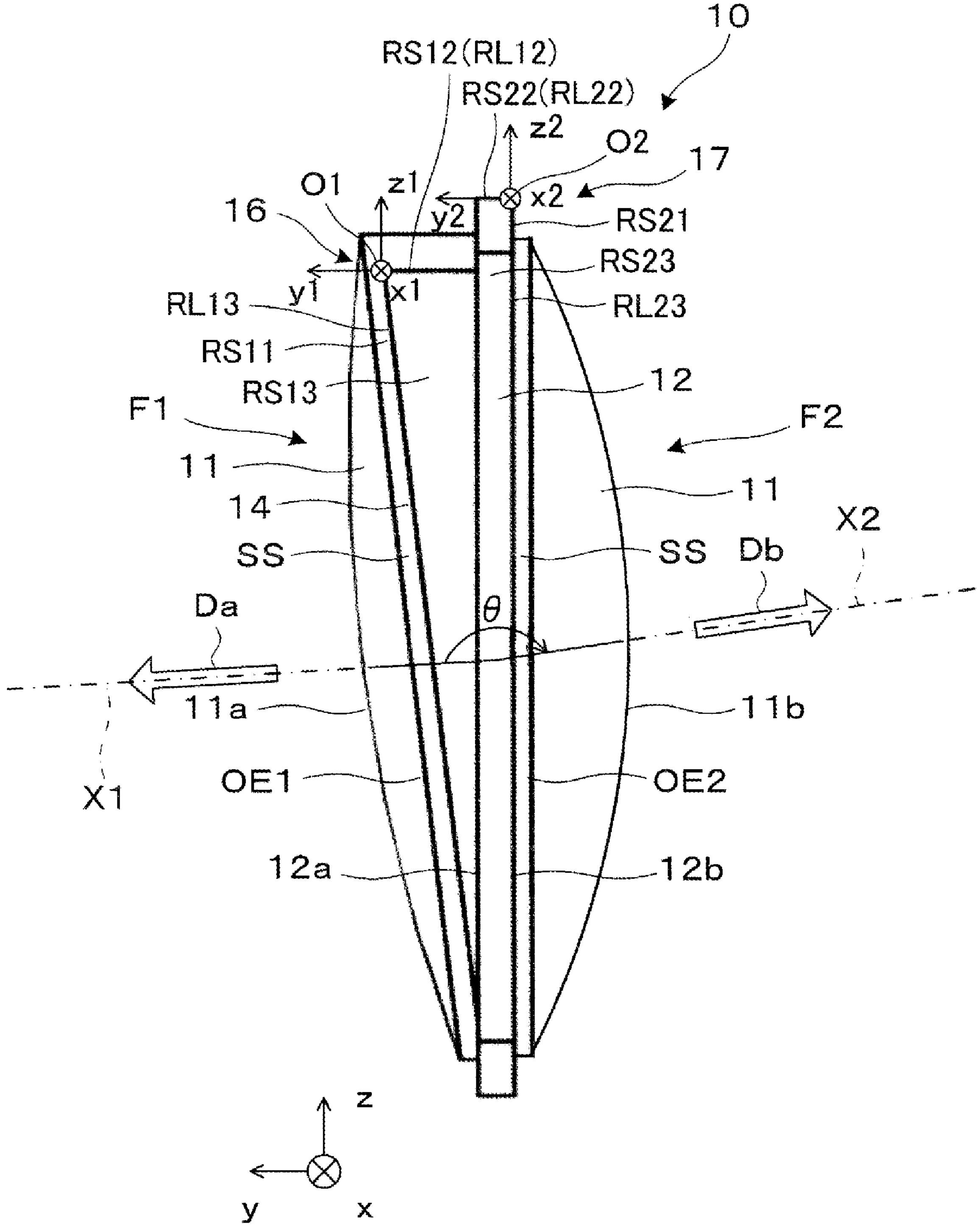
FIG. 3 is a side view of the optical member.

FIGS. 1 to 3 are views for describing an external shape of an optical member 10 according to the embodiment. In FIG. 2, region AR1 is a front view of the optical member 10, and region AR2 is a back view of the optical member 10. In FIG. 1, and the like, x, y, and z constitute a Cartesian coordinate system, indicating reference directions of the optical member 10.

The optical member 10 is a wedge lens having axes for incidence and emission, and includes a main body 11 having a circular contour and a rectangular frame 12 surrounding the outer circumference of the main body 11.

The main body 11 includes a first optically effective surface 11*a* and a second optically effective surface 11*b* as a plurality of optically effective surfaces. Although the first optically effective surface 11*a* is, for example, a free-form surface, it may be a non-spherical surface or a spherical surface. Although the second optically effective surface 11*b* is, for example, a free-form surface as well, it may be a non-spherical surface or a spherical surface. Although the first optically effective surface 11*a* and the second optically effective surface 11*b* face in substantially opposite directions, an incident axis X1 and an emission axis X2 are not parallel to each other and are slightly inclined to each other. A direction Da of the first optically effective surface 11*a* and a direction Db of the second optically effective surface 11*b* have an angle θ of approximately 170 degrees, and can be said to have an angle of approximately 90° or greater together. The direction Da of the first optically effective surface 11*a* is not based on the incidence axis X1 corresponding to the optical axis, and can be a normal of the plane approximated to the first optically effective surface 11*a* or an axis of symmetry of a rotational symmetry surface approximated thereto. In this case, the plane or the rotational symmetry surface approximated to the first optically effective surface 11*a* is not limited to being approximated to the entire region of the first optically effective surface 11*a*, and may be, for example, approximated to the central region thereof. The direction Db of the second optically effective surface 11*b* is not based on the emission axis X2 corresponding to the optical axis, but can be a normal of the plane approximated to the second optically effective surface 11*b* or an axis of symmetry of a rotational symmetry surface approximated thereto, similarly to the direction Da of the first optically effective surface 11*a*.

One protrusion portion 14 is formed in the frame 12 on the first optically effective surface 11*a* side so as to surround the first optically effective surface 11*a*. A surface 14*a* of the protrusion portion 14 is a flat surface inclined with respect to a flat surface 12*a* of the frame 12, and reduces a level difference SS with an outer edge OE1 of the first optically effective surface 11*a*. Thus, the first optically effective surface 11*a* and the surface 14*a* placed near the first optically effective surface can be in a continuously extended state, and thus can be placed within the same measurement region and subject to batch measurement in non-contact-type measurement using a microscope or the like or contact-type measurement using a probe, or the like. By reducing the level difference SS with the outer edge OE1 of the first optically effective surface 11*a* as described above, the first optically effective surface 11*a* and the surface 14*a* placed near the first optically effective surface are easily measured collectively, in particular, during contact-type measurement.

A portion of the protrusion portion 14 constitutes a measurement reference member 16 that serves as a reference for positioning of the first optically effective surface 11*a*, and includes a measurement reference shape 16*a*. The measurement reference member 16 is a part of the protrusion portion formed in the frame 12. The measurement reference shape 16*a* includes three measurement reference planes RS11, RS12, and RS13, and includes three measurement reference lines RL11, RL12, and RL13. Here, the measurement reference line RL11 corresponds to the intersection line of the pair of the measurement reference planes RS11 and RS12, the measurement reference line RL12 corresponds to the intersection line of the pair of the measurement reference planes RS12 and RS13, and the measurement reference line RL13 corresponds to the intersection line of the pair of the measurement reference planes RS13 and RS11. The measurement reference shape 16*a* adopts an origin O1 and localized coordinates x1, y1, and z1 with respect to a first surface F1 including the first optically effective surface 11*a*. Although the localized coordinates x1, y1, and z1 are assumed to be parallel to the Cartesian coordinate system of x, y, and z as a whole, measurement is performed assuming that the coordinates are not strictly parallel for a real subject. In the illustrated example, although the localized coordinate x1 matches the measurement reference line RL11, and the localized coordinate y1 is on an extension line of the measurement reference line RL12, the localized coordinate z1 is slightly inclined with respect to an extension line of the measurement reference line RL13.

A surface 12*b* of the frame 12 reduces the level difference SS with an outer edge OE2 of the second optically effective surface 11*b*. Thus, the second optically effective surface 11*b* and the surface 12*b* placed near the second optically effective surface can be in a continuously extended state, and thus can be placed within the same measurement region and subject to batch measurement in non-contact-type measurement using a microscope or the like or contact-type measurement using a probe, or the like. By reducing the level difference SS with the outer edge OE2 of the second optically effective surface 11*b* as described above, the second optically effective surface 11*b* and the surface 12*b* placed near the second optically effective surface are easily measured collectively, in particular, during contact-type measurement.

A portion of the frame 12 on the second optically effective surface 11*b* side constitutes a measurement reference member 17 that serves as a reference for positioning of the second optically effective surface 11*b*, and has an overall reference shape 17*a*. The measurement reference member 17 is a part of the protrusion portion formed in the frame 12. The overall reference shape 17*a* corresponds to a datum reference that is a reference with respect to design of the optical member 10. The overall reference shape 17*a* includes three measurement reference planes RS21, RS22, and RS23, and includes three measurement reference lines RL21, RL22, and RL23. Here, the measurement reference line RL21 corresponds to the intersection line of the pair of the measurement reference planes RS21 and RS22, the measurement reference line RL22 corresponds to the intersection line of the pair of the measurement reference planes RS22 and RS23, and the measurement reference line RL23 corresponds to the intersection line of the pair of the measurement reference planes RS23 and RS21. The measurement reference shape 17*a* adopts an origin O2 and localized coordinates x2, y2, and z2 with respect to a second surface F2 including the second optically effective surface 11*b*. Although the localized coordinates x2, y2, and z2 are assumed to be parallel to the Cartesian coordinate system of x, y, and z as a whole, measurement is performed assuming that the coordinates are not strictly parallel for a real subject. In the illustrated example, the localized coordinate x2 matches the measurement reference line RL21, and the localized coordinate z2 is on an extension line of the measurement reference line RL23. Further, the localized coordinate y2 is on an extension line of a virtual intersection line (not illustrated) of the pair of the measurement reference planes RS22 and RS23.

Figure 4:
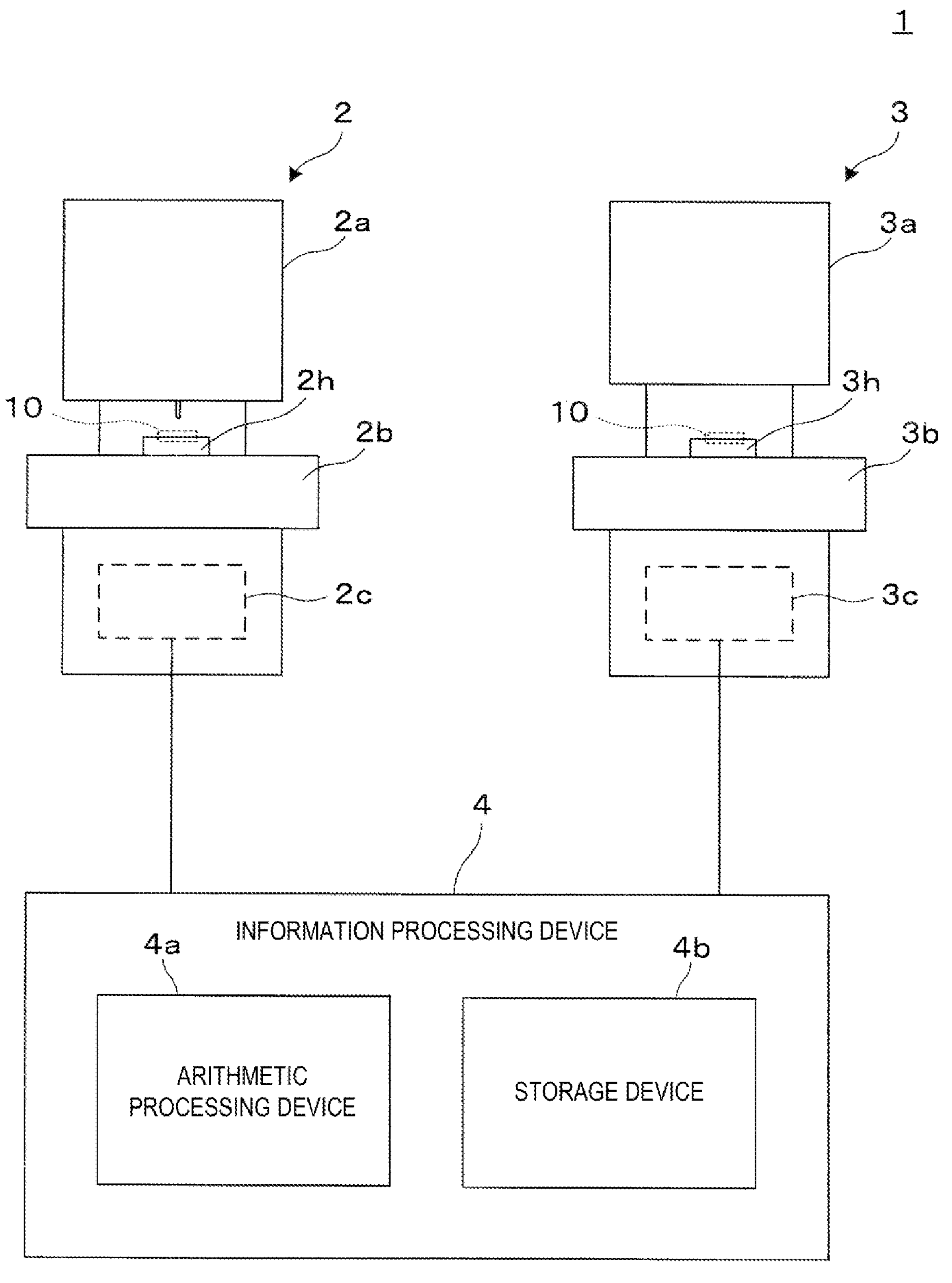
FIG. 4 is a conceptual diagram for describing a measurement system for the optical member.

FIG. 4 is a conceptual diagram for describing a measurement system 1 for the optical member 10, and the measurement system 1 evaluates shape accuracy including optical accuracy of the optical member 10 by combining two measurement methods. The measurement system 1 includes a first measurement device 2, a second measurement device 3, and an information processing device 4.

The first measurement device 2 is, for example, a known three-dimensional shape measurement device, and includes a measuring head 2*a*, a stage 2*b*, and a drive control device 2*c*. When the first measurement device 2 is a three-dimensional shape measurement device, the measuring head 2*a* enables contact-type shape measurement using a probe that is three-dimensionally displaced, for example. The stage 2*b* supports the optical members 10 via a holder 2*h*, enabling placement and postures of the optical member 10 to be set to a desired state. The drive control device 2*c* detects a surface shape of the optical member 10 with high accuracy by operating the measuring head 2*a* and the stage 2*b*. The drive control device 2*c* temporarily holds the measurement results of the surface shape of the optical member 10 and outputs the surface measurement data to an information processing device 4. The first measurement device 2 can measure a surface or a line forming a characteristic shape formed within or outside the optical surface of the optical member 10, and can determine a position and a posture of the characteristic shape. The first measurement device 2 has the optical member 10 with a plurality of optical surfaces, and when the first measurement device 2 is not capable of measuring the plurality of optical surfaces at the same time, the first measurement device re-sets the holder 2*h* to invert the optical member 10, and then measures the optical member 10 again.

The second measurement device 3 is, for example, a known tool microscope, and includes a measuring head 3*a*, a stage 3*b*, and a drive control device 3*c*. When the second measurement device 3 is a tool microscope, the measuring head 3*a* enables non-contact dimension measurement using, for example, an imaging optical system or an image sensor. The stage 3*b* supports the optical members 10 via a holder 3*h*, enabling placement and postures of the optical member 10 to be set to a desired state. The drive control device 3*c* causes the measuring head 3*a* and the stage 3*b* to operate, and measures the shape information such as the placement, dimensions, and the like of each part of the optical member 10 with high accuracy through image processing or the like of obtained image data. The drive control device 3*c* temporarily holds the shape information of the optical member 10 and outputs the shape measurement data to the information processing device 4. The second measurement device 3 can measure a surface or a line forming a characteristic shape formed within or outside the optical surfaces of the optical member 10, and can determine a position and a posture of the characteristic shape. In determining a position and a posture of the characteristic shape, processing is performed such that a scale or graphic is fitted to the target image to aid measurement. In addition, by observing postures of the optical member 10 in various directions using the stage 3*b* while changing the postures, the measurement accuracy of the characteristic shape can be improved.

The information processing device 4 is a computer, and includes an arithmetic processing device 4*a* and a storage device 4*b*. The arithmetic processing device 4*a* calculates, based on the surface measurement data obtained by the first measurement device 2 and the shape measurement data obtained by the second measurement device 3, unified measurement information for the overall shape of the optical member 10, and stores the calculation result in the storage device 4*b*. The information processing device 4 unifies a plurality of pieces of surface measurement data regarding the same optical member 10 obtained by the first measurement device 2 with the shape measurement data regarding a common reference obtained by the second measurement device 3, determines the shape and positional relationship of the plurality of optical surfaces of the optical member 10, and evaluates the optical performance of the optical member 10.

Specific measurement of the optical member 10 illustrated in FIG. 3 and the like will be described. First, the first measurement device 2 illustrated in FIG. 4 is used to measure the first surface F1 of the optical member 10. The measurement result of the first surface F1 of the optical member 10 includes information regarding the three-dimensional shape of the first optically effective surface 11*a* and information regarding the three-dimensional shape of the measurement reference shape 16*a*, and the information processing device 4 determines reference information of the first surface F1 (specifically, the origin O1 and the localized coordinates x1, y1, and z1) from the three-dimensional shape of the measurement reference shape 16*a*, and converts the three-dimensional shape of the first optically effective surface 11*a* into coordinate information based on the localized coordinates x1, y1, and z1. For such coordinate conversion, a known coordinate conversion technique, that is, an arithmetic process using a matrix and a vector such as rotation and translation is used. Next, the first measurement device 2 is used to measure a second surface F2 of the optical member 10. The measurement result of the second surface F2 of the optical member 10 includes information regarding the three-dimensional shape of the second optically effective surface 11*b* and information regarding the three-dimensional shape of the measurement reference shape 17*a*, and the information processing device 4 determines reference information of the second surface F2 (specifically, the origin O2 and the localized coordinates x2, y2, and z2) from the three-dimensional shape of the measurement reference shape 17*a*, and converts the three-dimensional shape of the second optically effective surface 11*b* into coordinate information based on the localized coordinates x2, y2, and z2. A known coordinate conversion method is used for the coordinate conversion. Then, the second measurement device 3 illustrated in FIG. 4 is used to collectively measure the measurement reference shape 16*a* of the first surface F1 and the measurement reference shape 17*a* of the second surface F2. In the measurement using the second measurement device 3, information regarding the relative positional relationship between the localized coordinates x1, y1, and z1 and the localized coordinates x2, y2, and z2 can be acquired, and the information processing device 4 can calculate and evaluate the relative rotational amount and the translational movement amount of the localized coordinates x1, y1, and z1 and the localized coordinates x2, y2, and z2. Accordingly, the three-dimensional shapes of the first optically effective surface 11*a* and the second optically effective surface 11*b* can be determined with reference to the common single localized coordinates x2, y2, and z2, that is, a datum reference, and a relative positional relationship between the first optically effective surface 11*a* and the second optically effective surface 11*b* can be determined, and the optical performance of the optical member 10 can be comprehensively evaluated.

In the above measurement, the measurement reference shapes 16*a* and 17*a* (see FIG. 2 and the like) include the reference planes and the reference lines constituting the protruding outer shape, and can be easily measured by the measurement devices 2 and 3.

Figure 5:
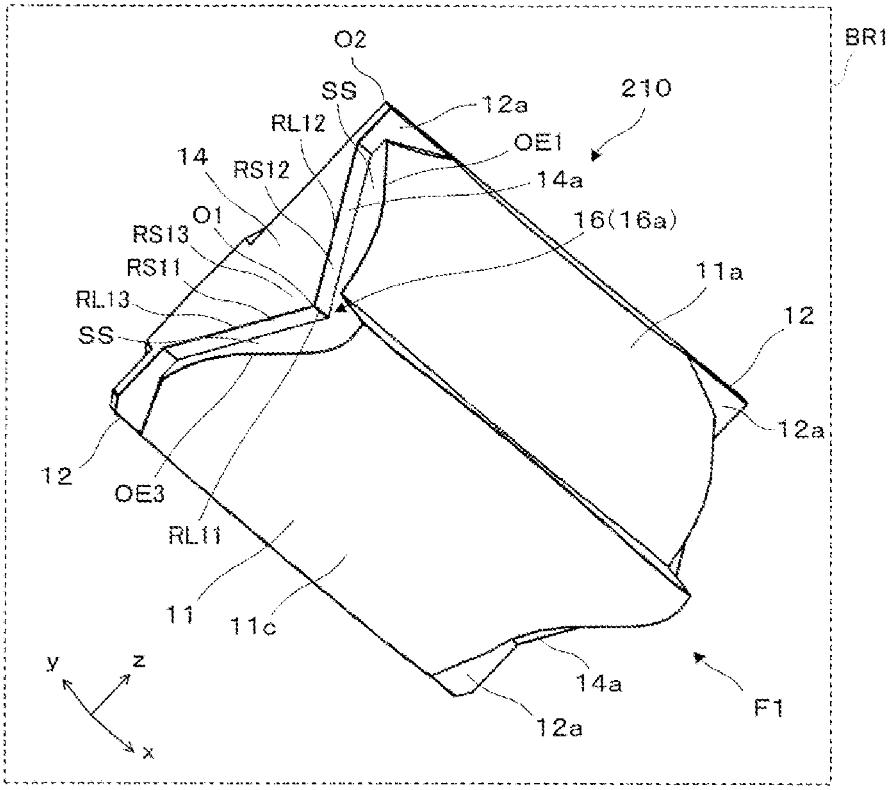
FIG. 5 is a perspective view for describing one side of an optical member according to a modified example.
Figure 5:
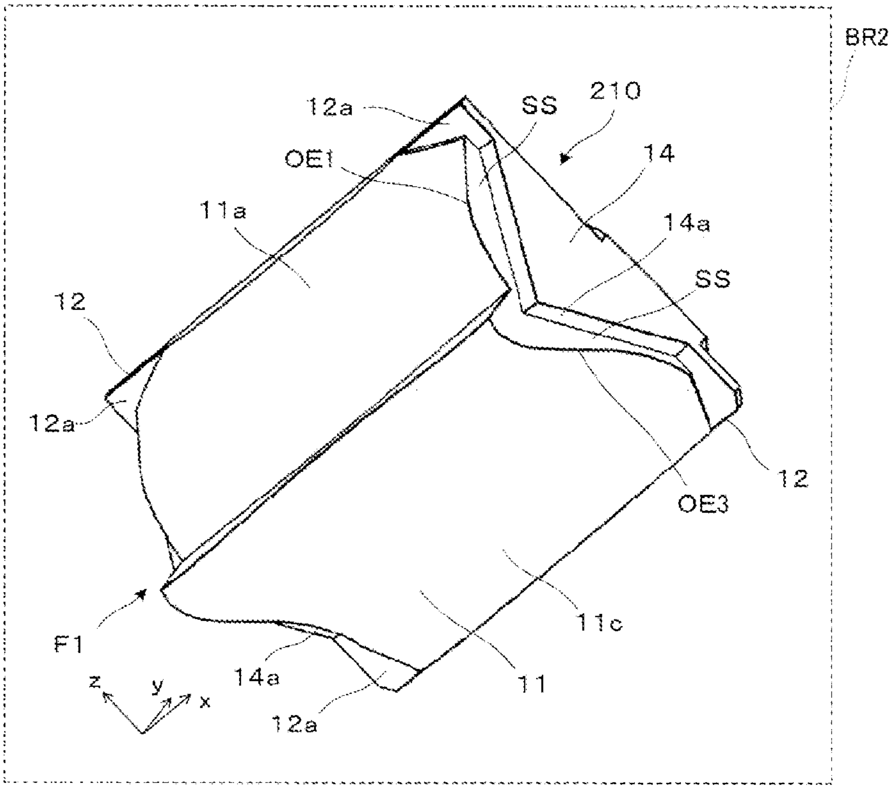
Figure 6:
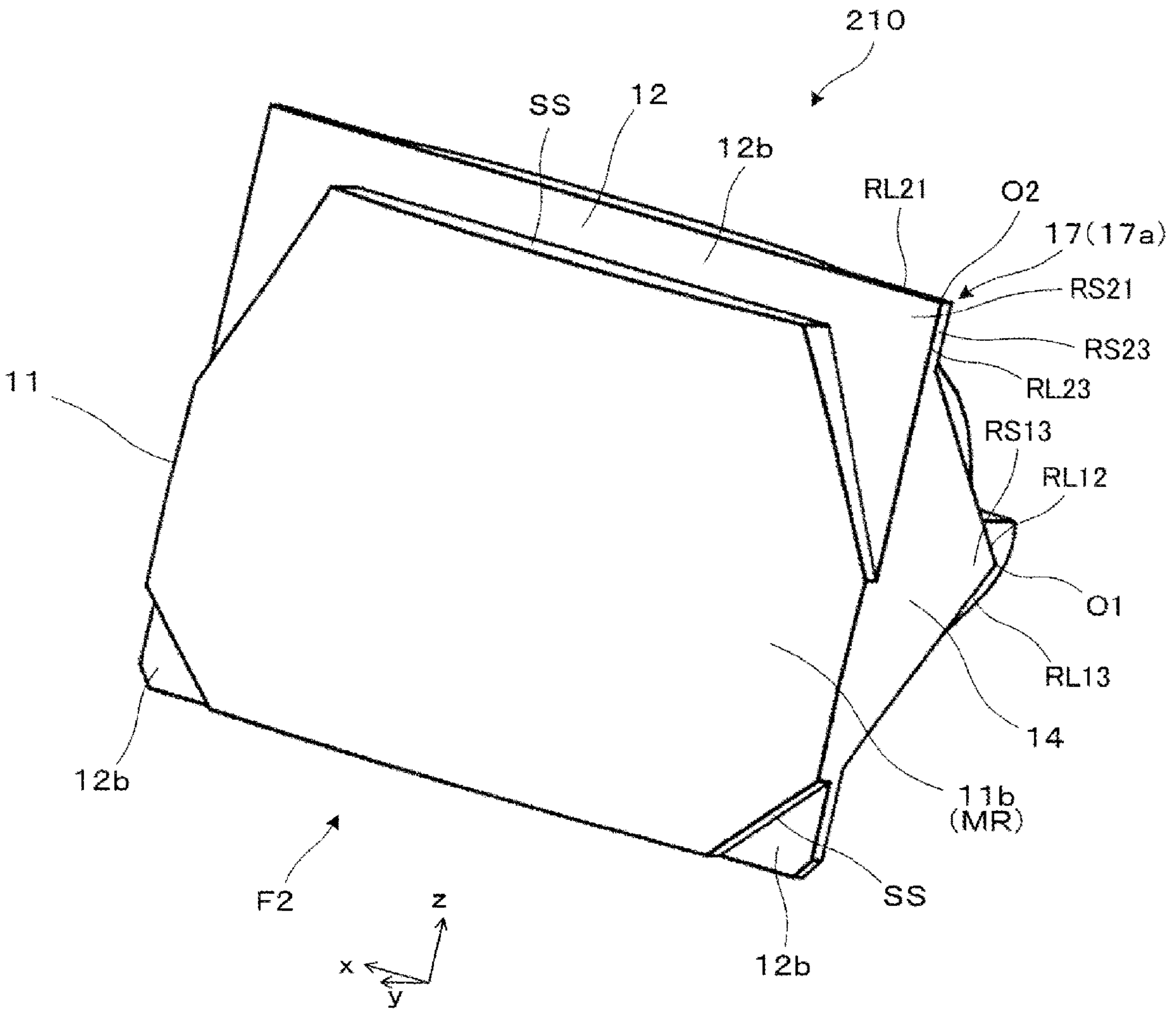
FIG. 6 is a perspective view for describing the other side of the optical member according to the modified example.
Figure 7:
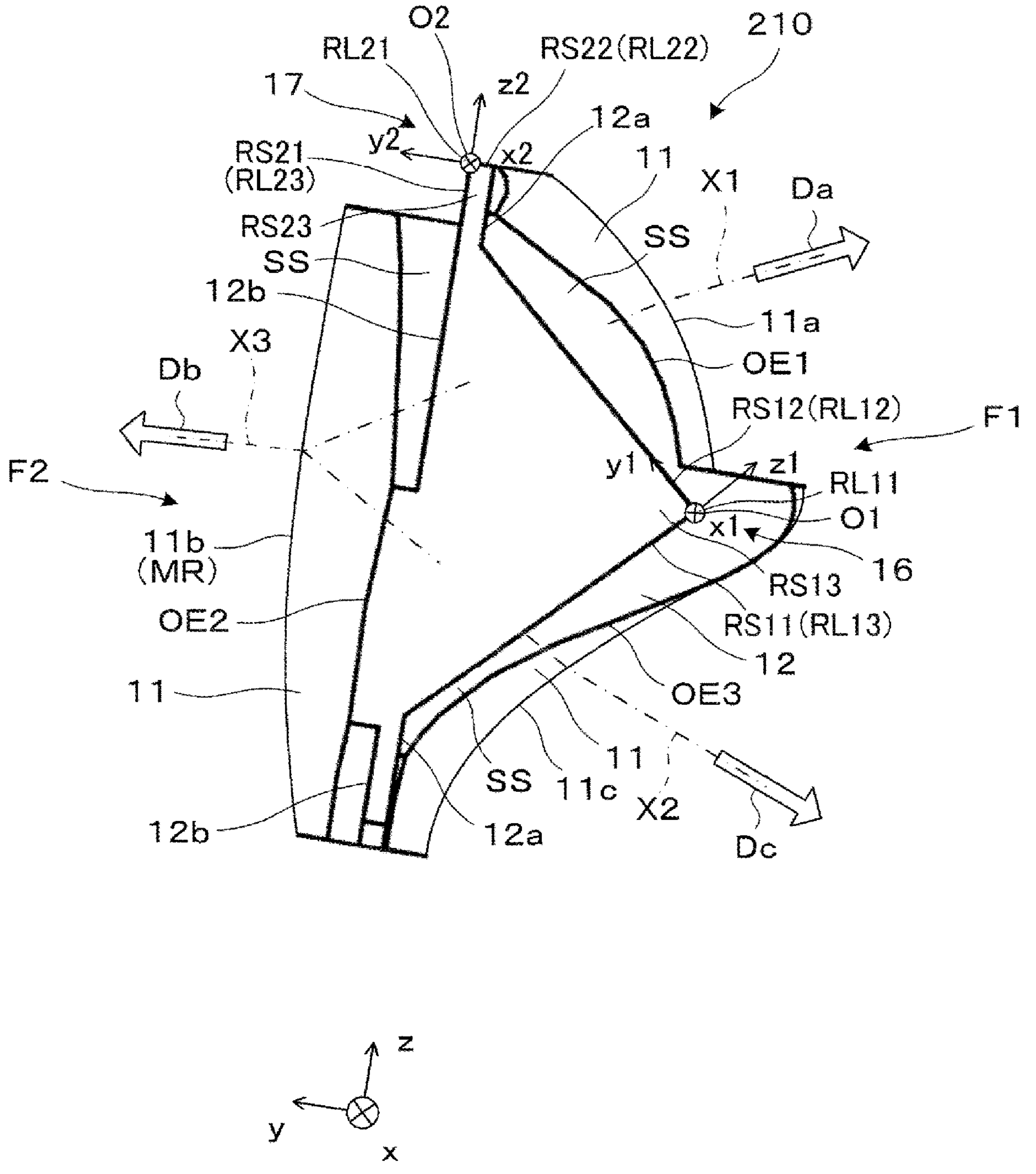
FIG. 7 is a side surface view of the optical member according to the modified example.

FIGS. 5 to 6 are diagrams for describing an external shape of an optical member 210 according to a modified example. In FIG. 5, region BR1 is a perspective view in which one end of the optical member 210 in the lateral direction is visible, and region BR2 is a perspective view in which the other end of the optical member 210 in the lateral direction is visible.

The optical member 210 is a prism lens having a reflection surface therein, and includes a main body 11 having a contour close to a triangular prism and frames 12 provided at both ends of the main body 11.

The main body 11 includes a first optically effective surface 11*a*, a second optically effective surface 11*b*, and a third optically effective surface 11*c* as a plurality of optically effective surfaces. Although the first optically effective surface 11*a* is, for example, a free-form surface, it may be a non-spherical surface or a spherical surface. The second optically effective surface 11*b* is a reflection surface MR with a reflective film formed thereon, and although it is, for example, a free-form surface, it may be a non-spherical surface or a spherical surface. Although the third optically effective surface 11*c* is, for example, a free-form surface, it may be a non-spherical surface or a spherical surface. Although an incidence axis X1 on an outer side of the first optically effective surface 11*a*, a main axis X3 of the second optically effective surface 11*b*, and an emission axis X2 of the third optically effective surface 11*c* are on the same plane, these axes are inclined with respect to each other. Here, the main axis X3 of the second optically effective surface 11*b* corresponds to a bisector of the optical axis before and after light is reflected on the inner surface of the second optically effective surface 11*b* along the inside of the main body 11. A direction Da including the incidence axis X1 of the first optically effective surface 11*a* and a direction Dc including the emission axis X2 of the third optically effective surface 11*c* have an angle of 90° or lower. On the other hand, the direction Da including the incidence axis X1 of the first optically effective surface 11*a* and the direction Dc including the emission axis X2 of the third optically effective surface 11*c* have an angle of 90° or higher in a direction Db including the main axis X3 of the second optically effective surface 11*b*.

One protrusion portion 14 is formed in the frame 12 so as to surround the first optically effective surface 11*a* and the third optically effective surface 11*c*. A surface 14*a* of the protrusion portion 14 reduces a level difference SS between an outer edge OE1 of the first optically effective surface 11*a* and an outer edge OE3 of the third optically effective surface 11*c*. Thus, the first optically effective surface 11*a* and the surface 14*a* placed near the first optically effective surface can be in a continuously extended state, the third optically effective surface 11*c* and the surface 14*a* placed near the third optically effective surface can be in a continuously extended state, and thus can be placed within the same measurement region and subject to batch measurement in non-contact-type measurement using a microscope or the like or contact-type measurement using a probe, or the like. By reducing the level difference SS between the outer edge OE1 of the first optically effective surface 11*a* and the outer edge OE3 of the third optically effective surface 11*c* as described above, the first optically effective surface 11*a*, the third optically effective surface 11*c*, and the surface 14*a* placed near the surfaces are easily measured collectively, in particular, during contact-type measurement.

A portion of the protrusion portion 14 constitutes a measurement reference member 16 that serves as a common reference for positioning of the first optically effective surface 11*a* and the third optically effective surface 11*c*, and includes a measurement reference shape 16*a*. The measurement reference member 16 is a common measurement member. The measurement reference shape 16*a* includes three measurement reference planes RS11, RS12, and RS13, and includes three measurement reference lines RL11, RL12, and RL13. Here, the measurement reference line RL11 corresponds to the intersection line of the pair of the measurement reference planes RS11 and RS12, the measurement reference line RL12 corresponds to the intersection line of the pair of the measurement reference planes RS12 and RS13, and the measurement reference line RL13 corresponds to the intersection line of the pair of measurement reference planes RS13 and RS11. The measurement reference shape 16*a* adopts an origin O1 and localized coordinates x1, y1, and z1 with respect to a first surface F1 including the first optically effective surface 11*a* and the third optically effective surface 11*c*. Although the localized coordinates x1, y1, and z1 are orthogonal to each other, they are not parallel to the Cartesian coordinate system of x, y, and z as a whole. In the illustrated example, the localized coordinate x1 matches the measurement reference line RL11, the localized coordinate y1 matches the measurement reference line RL12, and the localized coordinate z1 is on an extension line of the measurement reference line RL13.

A surface 12*b* of the frame 12 reduces the level difference SS with the outer edge OE2 of the second optically effective surface 11*b*. Thus, the second optically effective surface 11*b* and the surface 12*b* placed near the second optically effective surface can be in a continuously extended state, and thus can be placed within the same measurement region and subject to batch measurement in non-contact-type measurement using a microscope or the like or contact-type measurement using a probe, or the like. By reducing the level difference SS with the outer edge OE2 of the second optically effective surface 11*b* as described above, the second optically effective surface 11*b* and the surface 12*b* placed near the second optically effective surface are easily measured collectively, in particular, during contact-type measurement.

A portion of the frame 12 on the second optically effective surface 11*b* side constitutes a measurement reference member 17 that serves as a reference for positioning of the second optically effective surface 11*b*, and has an overall reference shape 17*a*. The overall reference shape 17*a* corresponds to a datum reference that is a reference with respect to design of the optical member 210. The overall reference shape 17*a* includes three measurement reference planes RS21, RS22, and RS23, and includes three measurement reference lines RL21, RL22, and RL23. Here, the measurement reference line RL21 corresponds to the intersection line of the pair of the measurement reference planes RS21 and RS22, the measurement reference line RL22 corresponds to the intersection line of the pair of the measurement reference planes RS22 and RS23, and the measurement reference line RL23 corresponds to the intersection line of the pair of the measurement reference planes RS23 and RS21. The measurement reference shape 17*a* adopts an origin O2 and localized coordinates x2, y2, and z2 with respect to a second surface F2 including the second optically effective surface 11*b*. Although the localized coordinates x2, y2, and z2 are orthogonal to each other, they are not parallel to the Cartesian coordinate system of x, y, and z as a whole. In the illustrated example, the localized coordinate x2 matches the measurement reference line RL21, the localized coordinate y2 is on an extension line of the measurement reference line RL22, and the localized coordinate z2 is on an extension line of the measurement reference line RL23.

Specific measurement of the optical member 210 will be described. First, the first measurement device 2 illustrated in FIG. 4 is used to measure the first surface F1 of the optical member 210. The measurement result of the first surface F1 of the optical member 210 includes information regarding the three-dimensional shapes of the first optically effective surface 11*a* and the third optically effective surface 11*c* and information regarding the three-dimensional shape of the measurement reference shape 16*a*, and the information processing device 4 determines reference information of the first surface F1 (specifically, the origin O1 and the localized coordinates x1, y1, and z1) from the three-dimensional shape of the measurement reference shape 16*a*, and converts the three-dimensional shapes of the first optically effective surface 11*a* and the third optically effective surface 11*c* into coordinate information based on the localized coordinates x1, y1, and z1. For the coordinate conversion, a known coordinate conversion technique, that is, an arithmetic process operation using a matrix and a vector such as rotation and translation, is used. Next, the first measurement device 2 is used to measure the second surface F2 of the optical member 210. The measurement result of the second surface F2 of the optical member 210 includes information regarding the three-dimensional shape of the second optically effective surface 11*b* and information regarding the three-dimensional shape of the measurement reference shape 17*a*, and the information processing device 4 determines reference information of the second surface F2 (specifically, the origin O2 and the localized coordinates x2, y2, and z2) from the three-dimensional shape of the measurement reference shape 17*a*, and converts the three-dimensional shape of the second optically effective surface 11*b* into coordinate information based on the localized coordinates x2, y2, and z2. A known coordinate conversion method is used for the coordinate conversion. Then, the second measurement device 3 illustrated in FIG. 4 is used to collectively measure the measurement reference shape 16*a* of the first surface F1 and the measurement reference shape 17*a* of the second surface F2. In the measurement using the second measurement device 3, information regarding the relative positional relationship between the localized coordinates x1, y1, and z1 and the localized coordinates x2, y2, and z2 can be acquired, and the information processing device 4 can calculate and evaluate the relative rotational amount and the translational movement amount of the localized coordinates x1, y1, and z1 and the localized coordinates x2, y2, and z2. Accordingly, the three-dimensional shapes of the first optically effective surface 11*a*, the second optically effective surface 11*b*, and the third optically effective surface 11*c* can be determined based on the common single localized coordinates x2, y2, and z2, that is, a datum reference, and a relative positional relationship between the first optically effective surface 11*a*, the second optically effective surface 11*b*, and the third optically effective surface 11*c* can be determined, and the optical performance of the optical member 210 can be comprehensively evaluated.

Even if the plurality of optically effective surfaces 11*a* and 11*c* are separated from each other in the optical member 210, a common measurement reference member (a common measurement member) 16 shared by the plurality of optically effective surfaces 11*a* and 11*c* can be set, and the measurement reference member (a common measurement member) 16 can be formed in a small space due to their shared use. Further, this disclosure is not limited to the above, and measurement reference members may be provided on the individual optically effective surfaces 11*a* to 11*c*.

Figure 8:
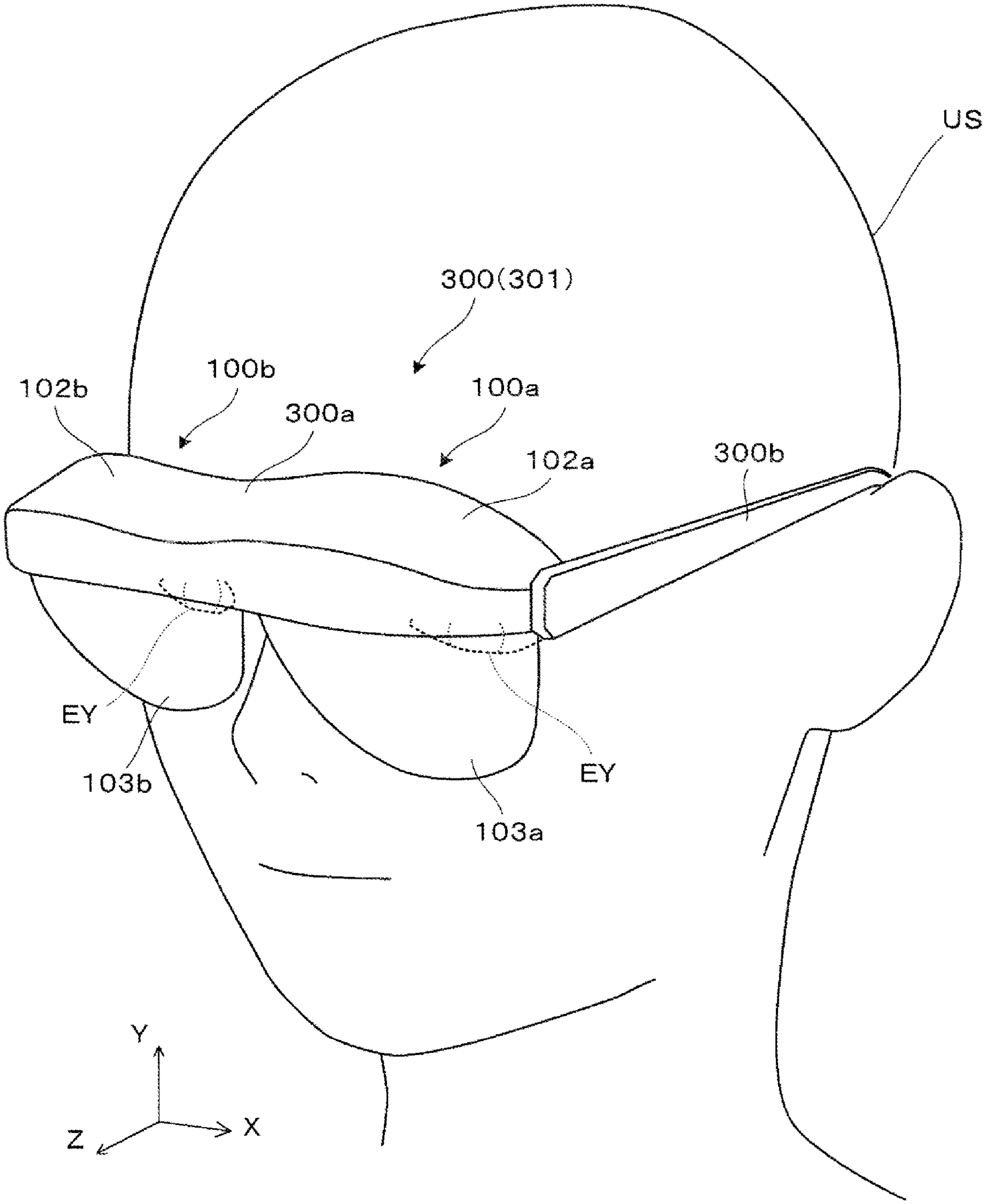
FIG. 8 is an external perspective view for describing a state in which an HMD incorporating an optical member is worn.

FIG. 8 is a diagram for describing a state in which a virtual image display device 300 incorporating the optical members 10 and 210 illustrated in FIGS. 1, 5, and the like is worn. The virtual image display device 300 is a head-mounted display device, in other words, a head-mounted display (hereinafter, also referred to as an "HMD") 301, and enables an observer or a wearer US who is wearing this device to be able to recognize an image that is a virtual image. In FIG. 8 and the like, X, Y, and Z constitute a Cartesian coordinate system, a +X direction corresponds to a lateral direction in which the two eyes EY of the observer or the wearer US who is wearing the HMD 301 are lined up, a +Y direction corresponds to an upward direction orthogonal to the lateral direction in which the two eyes EY of the wearer US are lined up, and a +Z direction corresponds to the forward direction or a front direction for the wearer US. A ±Y direction is parallel to a vertical axis or a vertical direction. Further, it is based on the premise that the coordinate system of X, Y, and Z does not match the localized coordinates x1, y1, and z1, or the localized coordinates x2, y2, and z2 illustrated in FIG. 1 and the like.

The virtual image display device 300 includes a main body device 300*a* placed to cover the front of the eyes of the wearer US, and a pair of temple-shape support devices 300*b* that support the main body device 300*a*. The main body device 300*a* includes a first display device 100*a* for the left eye and a second display device 100*b* for the right eye from the perspective of function. The first display device 100*a* includes a first display drive part 102*a* placed at the upper portion thereof, and a first combiner 103*a* in an eyeglass lens shape covering the front of the eye. Similarly, the second display device 100*b* includes a second display drive part 102*b* placed at the upper portion thereof, and a second combiner 103*b* in an eyeglass lens shape covering the front of the eye.

Figure 9:
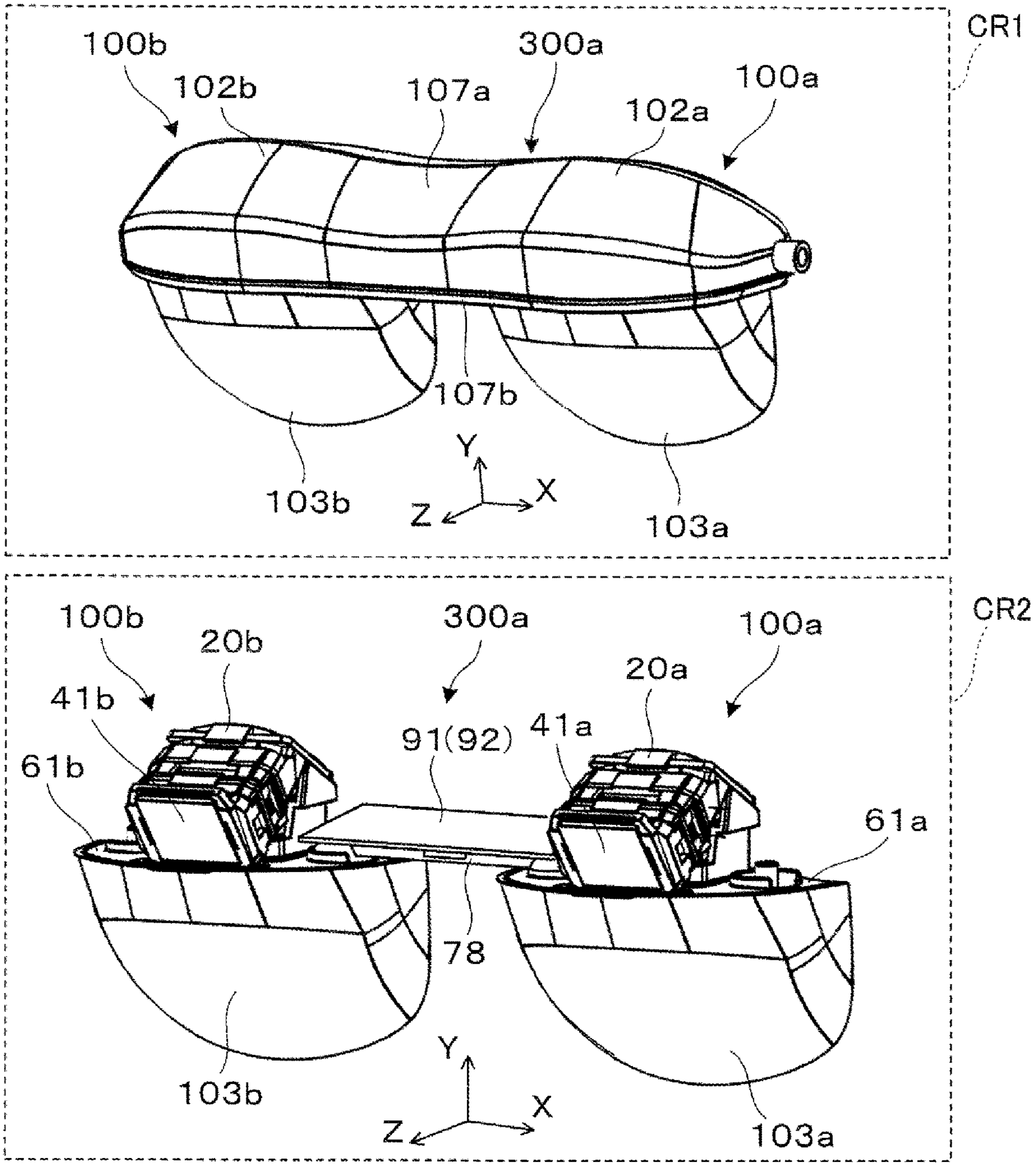
FIG. 9 includes perspective views illustrating the external appearance of the HMD and the inside thereof with the exterior member removed.

A structure and the like of the main body device 300*a* of the virtual image display device 300 will be described referring to FIG. 9. In FIG. 9, region CR1 is a perspective view of the external appearance of the main body device 300*a*, and region CR2 is a perspective view in which the interior of the main body device 300*a* is exposed.

The pair of the display drive parts 102*a* and 102*b* of the main body device 300*a* placed at the +Y side, that is, on the upper side, are connected to be integrated, and are covered by a dome-shaped upper exterior member 107*a* that is elongated in the lateral direction, and a flat plate-shaped lower exterior member 107*b*. The first combiner 103*a* and the second combiner 103*b* have a shape in which the upper portion of the hemispheres protruding to the front, that is, in the +Z direction, is cut, and are placed to project downward from the lower exterior member 107*b*.

The first display device 100*a* for the left eye includes a first image element 41*a*, a first optical system 20*a*, a first frame 61*a*, and the first combiner 103*a*. The first optical system 20*a* and the first combiner 103*a* are fixed to the first frame 61*a*, and the first image element 41*a* is fixed to the first optical system 20*a*. The second display device 100*b* for the right eye includes a second image element 41*b*, a second optical system 20*b*, a second frame 61*b*, and the second combiner 103*b*. The second display device 100*b* for the right eye has the same structure and functions as the first display device 100*a* for the left eye. In other words, the second image element 41*b* is similar to the first image element 41*a*, and the second optical system 20*b* is similar to the first optical system 20*a*, and the second combiner 103*b* is similar to the first combiner 103*a*.

The first display device 100*a* and the second display device 100*b* are connected and fixed internally via a fixing member 78. That is, the fixing member 78 supports the pair of frames 61*a* and 61*b* incorporated in the pair of display devices 100*a* and 100*b* at the center, and thus helps maintain the state in which the first display device 100*a* and the second display device 100*b* are relatively positioned. The one first frame 61*a* is a semi-disk-shaped metal member, and is coupled to one end of the metallic rod-shaped fixing member 78 at an inner end portion near the second frame 61*b*. The other second frame 61*b* is a semi-disk-shaped metal member, and is coupled to the other end of the rod-shaped fixing member 78 at an inner end portion near the first frame 61*a*. The pair of frames 61*a* and 61*b* are arranged to block a pair of openings having a similar contour that are formed in the lower-exterior member 107*b*.

A rectangular plate-shaped printed wired board 91 is placed on the fixing member 78 between the left and right display devices 100*a* and 100*b*. The printed wired board 91 includes a control device 92 that controls display operations of the first image element 41*a* and the second image element 41*b*. The control device 92 outputs a drive signal corresponding to a display image to the left and right image elements 41*a* and 41*b*, and controls a display operation of the left and right image elements 41*a* and 41*b*. The control device 92 includes, for example, an IF circuit, a signal processing circuit, and the like, and causes the left and right image elements 41*a* and 41*b* to display a two-dimensional image according to image data or an image signal received from the outside. Although not illustrated, the control device 92 includes a main board having an interface function for communication with an external device, which is not illustrated, and an integration function for coordinating operations of the first display device 100*a* with operations of the second display device 100*b*.

Figure 10:
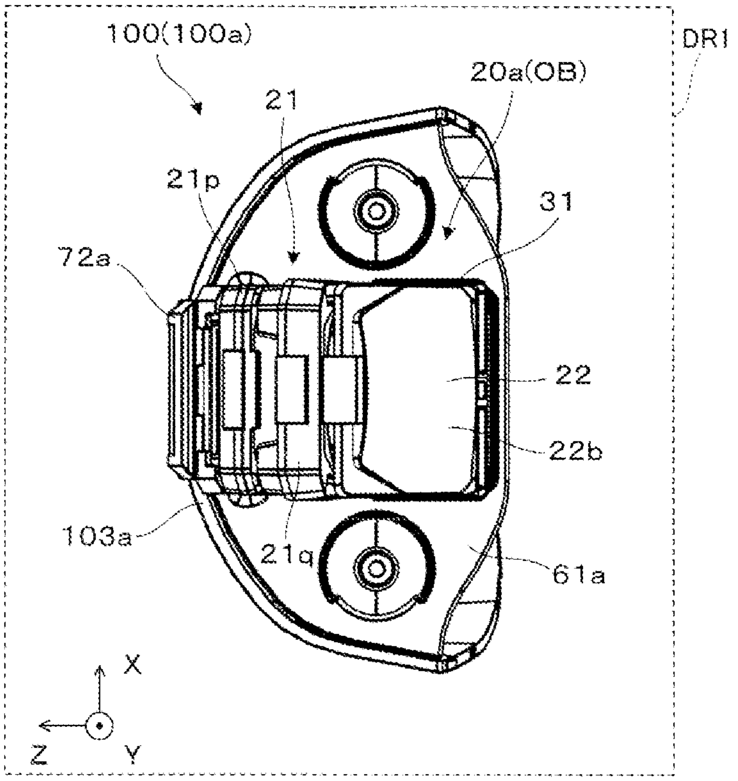
FIG. 10 illustrates a plan view and a side surface view of an optical unit.
Figure 10:
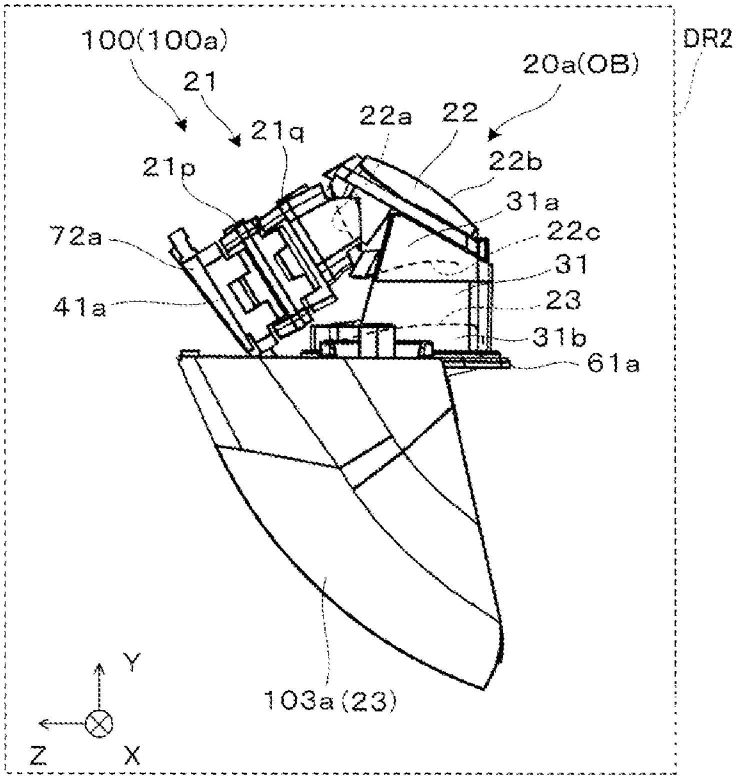

FIG. 10 illustrate an optical unit 100 constituting the first display device 100*a*. In FIG. 10, region DR1 is a plan view of the optical unit 100, and region DR2 is a side surface view of the optical unit 100. The optical unit 100 is an imaging optical system including the first optical system 20*a*, the first frame 61*a*, and the first combiner 103*a*, and is also referred to as an optical module. The first display device 100*a* is configured by assembling the first image element 41*a* into the optical unit 100.

In the optical unit 100, the first optical system 20*a* is fixed to the upper surface of the plate-shaped first frame 61*a* using adhesion, or the like, and the first combiner 103*a* is fixed to the front half of the circumference of the first frame 61*a* by adhering the upper end of the first combiner, or the like. The first optical system 20*a* includes a barrel 31 that supports optical elements. The barrel 31 is a support member placed between a prism mirror 22 and the first combiner 103*a*, or the like, supports the prism mirror 22 at an upper portion on the +Y side, and is fixed to the first frame 61*a* via a wedge-shaped optical element 23 at a lower portion. The prism mirror 22 supports a projection lens 21 that is a first optical member on a front side, that is, a +Z side, and the projection lens 21 supports a first image element 41*a* via a first holder 72*a* at the end portion on the side opposite to the prism mirror 22.

Figure 11:
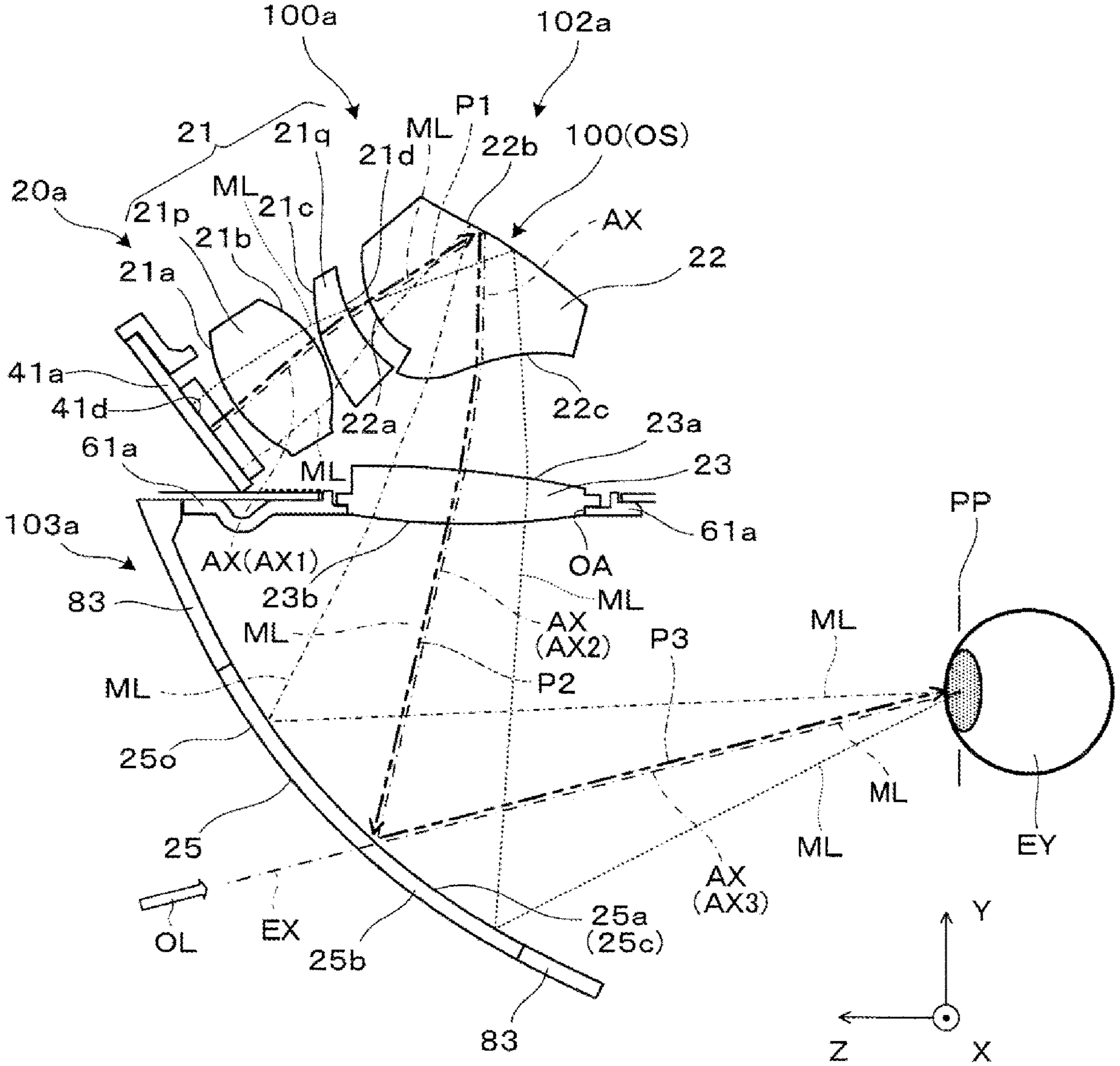
FIG. 11 is a conceptual side cross-sectional view for describing an optical system inside the HMD.

FIG. 11 is a side cross-sectional view for describing an optical structure of the first display device 100*a*. The first display device 100*a* includes the first image element 41*a* and the optical unit 100. The optical unit 100 includes, as optical elements, the projection lens 21, the prism mirror 22, the wedge-shaped optical element 23, and the see-through mirror 25. The projection lens 21, the prism mirror 22, and the wedge-shaped optical element 23 of the optical unit 100 correspond to the first optical system 20*a* illustrated in FIG. 9, and the see-through mirror 25 corresponds to the first combiner 103*a*. In the optical unit 100, the wedge-shaped optical element 23 is placed to fit into a step formed in an optical opening OA of the first frame 61*a*.

The first image element 41*a* is a self-luminous display device. The first image element 41*a* is, for example, an organic electro-luminescence (EL) display, and forms a color still image or moving image on a two-dimensional display surface 41*d*. The first image element 41*a* is not limited to an organic EL display, and can be replaced with a micro LED display, or a display device using inorganic EL, an organic LED, a laser array, a quantum dot light emission element, or the like. The first image element 41*a* is not limited to a self-luminous image light generation device, may include an LCD and other light modulation elements, and may form an image by illuminating the light modulation element with a light source such as a backlight. As the first image element 41*a*, a liquid crystal on silicon (LCOS) (LCoS is a registered trademark), a digital micro-mirror device, or the like may be used instead of the LCD.

The projection lens 21 includes the first lens 21*p* and the second lens 21*q*. The first lens 21*p* has an incidence surface 21*a* and an emission surface 21*b*, and the second lens 21*q* has an incidence surface 21*c* and an emission surface 21*d*. The projection lens 21 receives image light ML emitted from the first image element 41*a* and then causes the image light to be incident on the prism mirror 22. The projection lens 21 focuses the image light ML emitted from the first image element 41*a* into a state close to a parallel luminous flux. The prism mirror 22 includes an incidence surface 22*a*, an inner reflection surface 22*b*, and an emission surface 22*c*. The prism mirror 22 causes the image light ML incident from the front to be emitted such that the light bends in a direction inclining downward with respect to the direction opposite to the incidence direction (the direction of the light source when viewed from the prism mirror 22). The wedge-shaped optical element 23 includes an incidence surface 23*a* and an emission surface 23*b*, and allows the image light ML emitted from the prism mirror 22 toward the see-through mirror 25 to pass therethrough. The see-through mirror 25 includes a reflection surface 25*a* and an outer surface 250. The see-through mirror 25 enlarges an intermediate image formed on the light emission side of the prism mirror 22.

In the above, the prism mirror 22 corresponds to the optical member 210 illustrated in FIG. 4, and the like, and the incidence surface 22*a*, the inner reflection surface 22*b*, and the emission surface 22*c* of the prism mirror 22 correspond to the first optically effective surface 11*a*, the second optically effective surface 11*b*, and the third optically effective surface 11*c* of the optical member 210, respectively. The wedge-shaped optical element 23 corresponds to the optical member 10 illustrated in FIG. 1, and the like, and the incidence surface 23*a* and the emission surface 23*b* of the wedge-shaped optical element 23 correspond to the first optically effective surface 11*a* and the second optically effective surface 11*b* of the optical member 10, respectively.

The optical unit 100 serves as an off-axis optical system OS due to the see-through mirror 25 being a concave mirror. In the case of this embodiment, the projection lens 21, the prism mirror 22, the wedge-shaped optical element 23, and the see-through mirror 25 are placed to be non-axisymmetric and have an optical surface that is non-axisymmetric with respect to the longitudinal direction parallel to the Y-Z plane and intersecting the optical axes AX and symmetric sandwiching the optical axes AX therebetween in the lateral direction or the X direction. In this optical unit 100, that is, the off-axis optical system OS, optical axes AX are bent such that the optical axes AX extend along an off-axis surface corresponding to the paper surface (a surface parallel to the Y-Z plane), and the optical elements 21, 22, 23, and 25 are arrayed along the off-axis surface. The optical axes AX are placed in an Z shape due to a plurality of optical axis portions AX1, AX2, and AX3 each tilting at the start and end parts of the reflection surface when they are viewed on the cross section parallel to the Y-Z plane. In other words, on the off-axis surface parallel to the Y-Z plane, an optical path P1 from the projection lens 21 to an inner reflection surface 22*b*, an optical path P2 from the inner reflection surface 22*b* to the see-through mirror 25, and an optical path P3 from the see-through mirror 25 to the pupil position PP are placed to be bent in two stages in a Z shape. The off-axis surface (the surface parallel to the Y-Z plane) which is a reference surface extends parallel to the longitudinal Y direction. In this case, the optical elements 21, 22, 23, and 25 constituting the first display device 100*a* are arrayed by changing their height positions in the longitudinal direction.

Although the projection lens 21 is formed of, for example, a resin, it may also be formed of glass. In the projection lens 21, although optical surfaces 21*a*, 21*b*, 21*c*, and 21*d* are, for example, free-form surfaces, they may be non-spherical.

The prism mirror 22 reflects the image light ML from the projection lens 21 while refracting it. Although the prism mirror 22 is here formed of a resin, it may also be formed of glass. A refractive index of the main body of the prism mirror 22 is set to a value such that total reflection on the inner surface is achieved in consideration of a reflection angle of the image light ML. Although optical surfaces 22*a*, 22*b*, and 22*c* of the prism mirror 22 are free-form surfaces, for example, they may be non-spherical.

The wedge-shaped optical element 23 is placed between the prism mirror 22 and the see-through mirror 25, and has a role of improving the imaging state. Although the wedge-shaped optical element 23 is formed of a resin, it may also be made of glass. Although optical surfaces 23*a*, 23*b*, and 23*c* of the wedge-shaped optical element 23, are free-form surfaces, for example, they may be non-spherical.

The see-through mirror 25 is a plate-shaped optical member having a convex toward the outside and functioning as a concave mirror, and reflects the image light ML from the first optical system 20*a* toward the pupil position PP. The see-through mirror 25 is a mirror plate having a structure in which a mirror film 25*c* with optical transparency is formed on the front surface or the back surface of a resin or glass plate-shaped body 25*b*.

To describe the optical path, the image light ML from the first image element 41*a* is incident on the projection lens 21 and emitted from the projection lens 21 while being substantially collimated. The image light ML that has passed through the projection lens 21 is incident on the prism mirror 22, passes through the incidence surface 22*a* while being refracted, is reflected by the inner reflection surface 22*b* with a high reflectance close to 100%, and is refracted again by the emission surface 22*c*. The image light ML from the prism mirror 22 is incident on the see-through mirror 25 via the wedge-shaped optical element 23 and is reflected by the reflection surface 25*a* with a reflectance of about 50% or lower. The image light ML reflected by the see-through mirror 25 is incident on the pupil position PP at which the eye EY or pupil of the wearer US is placed. Outside light OL that has passed through the see-through mirror 25 and the support plate 83 therearound is also incident on the pupil position PP. In other words, the wearer US wearing the first display device 100*a* can observe a virtual image formed from the image light ML with the virtual image overlapping on the outside image.

Positioning and fixing of elements such as the prism mirror 22, the wedge-shaped optical element 23, the projection lens 21, and the like constituting the first optical system 20*a* or an optical block OB illustrated in FIG. 10 will be described below.

Figure 12:
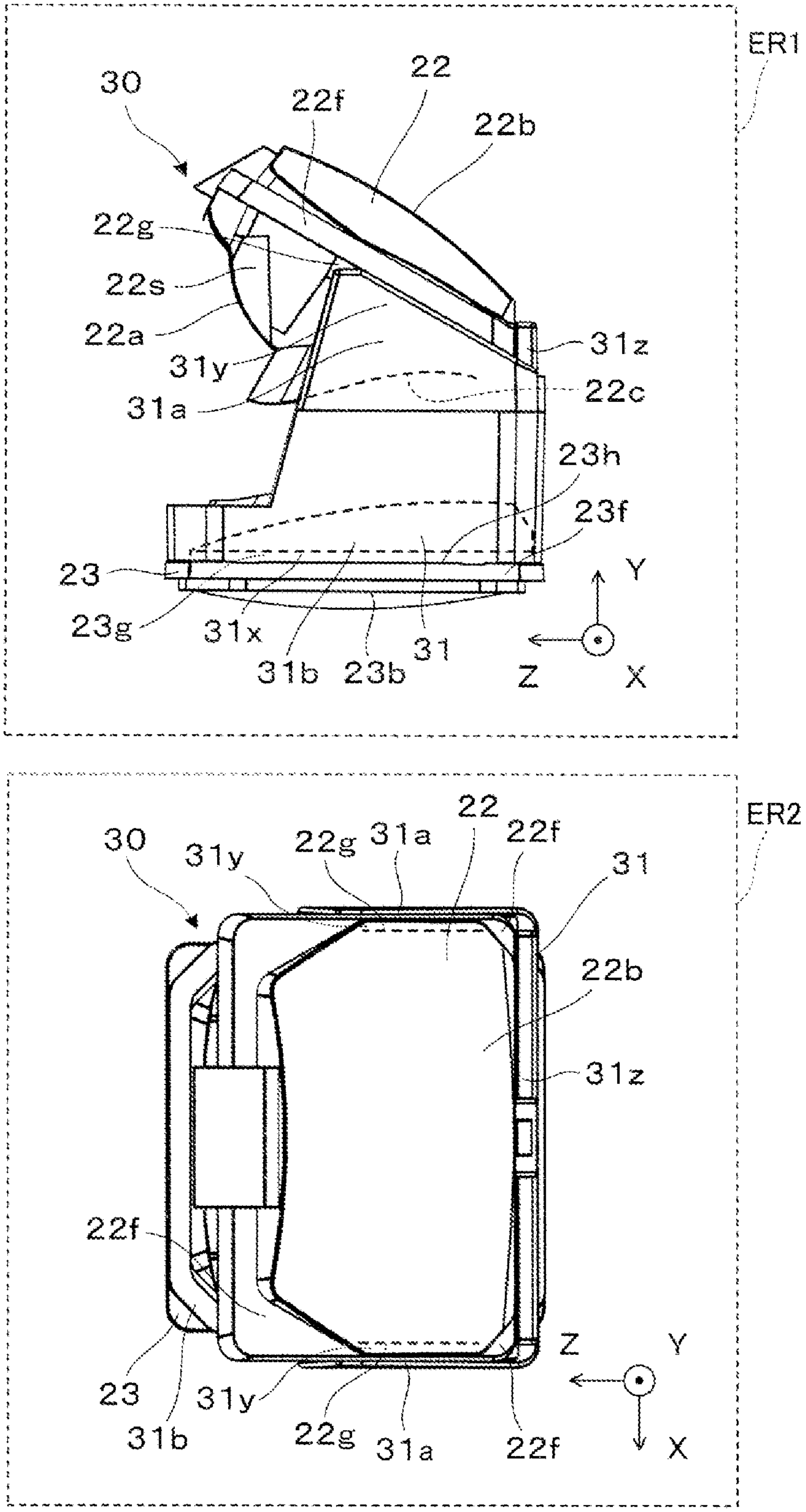
FIG. 12 is a diagram for describing a method of fixing a prism mirror and a wedge-shaped optical element.

FIG. 12 is a diagram for describing a method of fixing the prism mirror 22 and the wedge-shaped optical element 23 via the barrel 31. In FIG. 12, region ER1 is a side surface view of an optical block main body 30 integrated by the barrel 31, and region ER2 is a plan view of the optical block main body 30. Further, the part of the optical block OB integrating the prism mirror 22 and the wedge-shaped optical element 23 using the barrel 31 will be referred to as the optical block main body 30.

The prism mirror 22 is fixed in a positioned state with respect to the barrel 31 using fitting and one-siding. Specifically, the upper surface of a pair of fitting portions 31*y* and the inner surface of a restriction plate 31*z* formed in an upper portion 31*a* of the barrel 31 abut against the lower surface of a flange portion 22*f* of the prism mirror 22, and sandwich a stepped side surface 22*g* of the flange portion 22*f* between the inner surfaces of the fitting portions 31*y* while supporting the prism mirror 22 in an inclining state against the fitting portions 31*y*. Thus, the prism mirror 22 is positioned with respect to the barrel 31 for the placement in the three axis directions (X, Y, and Z directions) and three-axial rotational postures. For the joining of the prism mirror 22 and the barrel 31, a light-curable adhesive material, an ultrasonic fusion method, or the like can be used.

The wedge-shaped optical element 23 is fixed in a positioned state with respect to the barrel 31 using fitting. Specifically, the inner surface and the lower end surface of a fitting portion 31*x* corresponding to four sides of the lower portion 31*b* of the barrel 31 are fitted to a stepped side surface 23*g* and a stepped upper surface 23*h* of a flange portion 23*f* of the wedge-shaped optical element 23. Thus, the wedge-shaped optical element 23 is positioned with respect to the barrel 31 for the placement in the three axis directions and three-axial rotational postures. For the joining of the wedge-shaped optical element 23 and the barrel 31, a light-curable adhesive material, an ultrasonic fusion method, or the like can be used.

Figure 13:
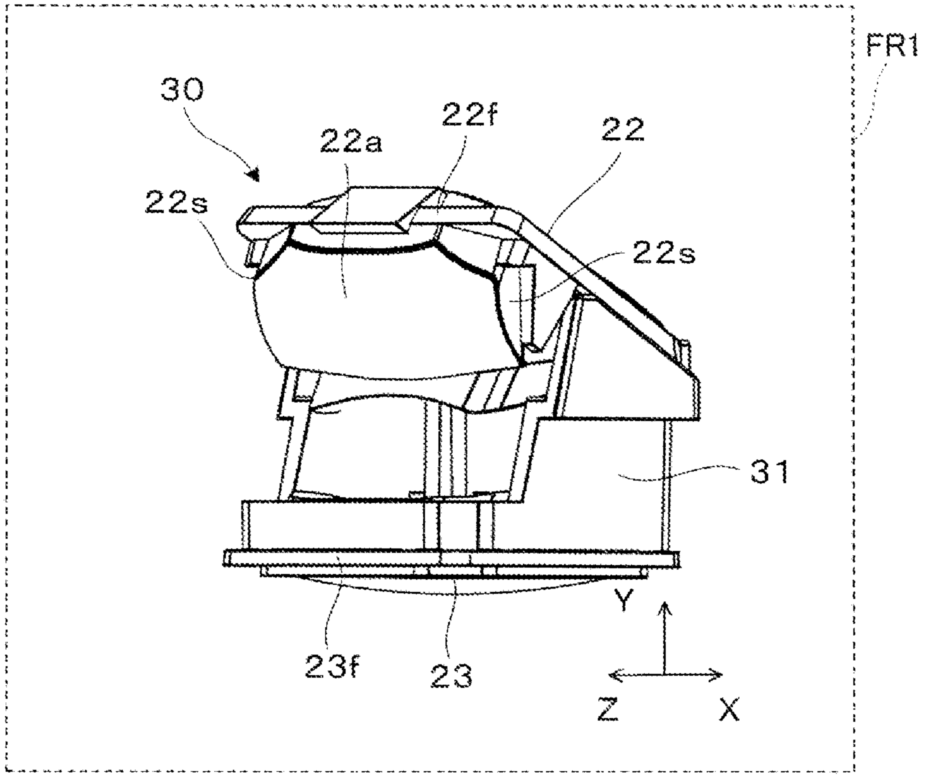
FIG. 13 is a diagram for describing fixing of a projection lens to an optical block main body.
Figure 13:
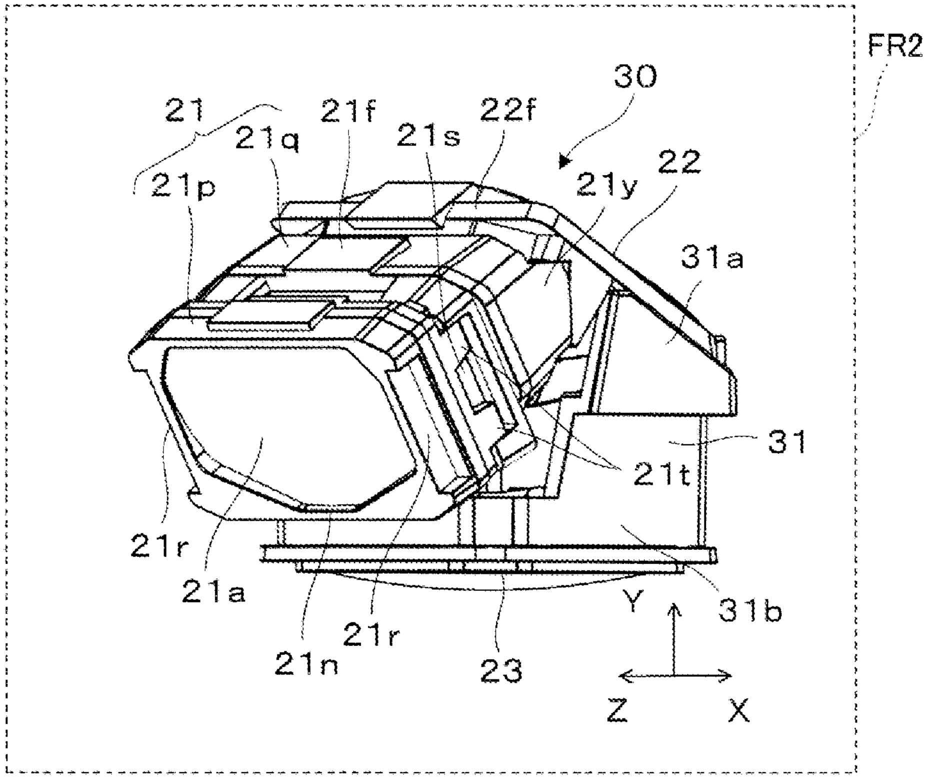

Fixation of the projection lens 21 with respect to the optical block main body 30 will be described with reference to FIG. 13. In FIG. 13, region FR1 is a perspective view of the optical block main body 30, and region FR2 is a perspective view of the optical block main body 30 and the projection lens 21.

The projection lens 21 is directly fixed to the prism mirror 22 of the optical block main body 30. At this time, the projection lens 21 is fixed in a positioned state with respect to the prism mirror 22 using fitting and one-siding. Specifically, a pair of claws 21*y* (only one of which is illustrated) formed in the flange portion 21*f* of the second lens 21*q* constituting the projection lens 21 is inserted into a pair of recess portions 22*s* so as to sandwich the pair of recess portions 22*s* formed in the flange portion 22*f* of the prism mirror 22. Thus, the pair of claws 21*y* of the second lens 21*q* grip the flange portion 22*f* of the prism mirror 22. At this time, the pair of claws 21*y* are fitted to the pair of recess portions 22*s*, and one-siding in which the reference surfaces provided in both elements come into contact with each other is performed. Thus, the second lens 21*q*, that is the projection lens 21, is positioned with respect to the prism mirror 22 for the placement in the three axis directions and three-axial rotational postures. For the joining of the second lens 21*q* and the prism mirror 22, a light-curable adhesive material, an ultrasonic fusion method, or the like can be used.

In the projection lens 21, the first lens 21*p* is directly fixed to the second lens 21*q*. At this time, the first lens 21*p* is fixed in a positioned state with respect to the second lens 21*q* using fitting. Specifically, two sets of claws 21*t* (only one set of which is illustrated) formed in a flange portion 21*n* of the first lens 21*p* is inserted into a pair of recess portions 21*s* so as to sandwich the pair of recess portions 21*s* (only one of which is illustrated) formed in the flange portion 21*f* of the second lens 21*q*. As a result, the plurality of claws 21*t* of the first lens 21*p* grip the flange portion 21*f* of the second lens 21*q*. At this time, the two sets of claws 21*t* are fitted to the pair of recess portions 21*s*. Thus, the first lens 21*p* is positioned with respect to the second lens 21*q* for the placement in the three axis directions and three-axial rotational postures. For the joining of the first lens 21*p* and the second lens 21*q*, a light-curable adhesive material, an ultrasonic fusion method, or the like can be used.

The first holder 72*a* (see FIG. 10) that supports the first image element 41*a* is directly fixed to the first lens 21*p* of the projection lens 21, using a pair of concave portions 21*r* formed in the flange portion 21*n* of the first lens 21*p* in a method similar to fixing of the first lens 21*p* to the second lens 21*q*.

As described above, the prism mirror 22 and the projection lens 21 constituting the optical block OB are directly fixed in the structure in which they are mutually positioned, and do not include a common member such as a mirror frame or a case. Therefore, it is possible to increase the accuracy of assembling the necessary members (specifically, those between the prism mirror 22 and the projection lens 21) while reducing the size of the optical block OB.

Although description is omitted, members corresponding to the measurement reference members 16 and 17 are formed in the first lens 21*p* and the second lens 21*q* constituting the projection lens 21 in the same manner as the wedge-shaped optical element 23, that is, the optical member 10 illustrated in FIG. 1, and the like. With such a measurement reference members, the three-dimensional shapes of the incidence surface 21*a* and the emission surface 21*b* of the first lens 21*p* can be determined based on the datum reference with respect to design, a relative positional relationship between the incidence surface 21*a* and the emission surface 21*b* can be determined, and the optical performance of the first lens 21*p* can be comprehensively evaluated. Even for the second lens 21*q*, the three-dimensional shapes of the incidence surface 21*c* and the emission surface 21*d* thereof can be determined based on the datum reference with respect to design, a relative positional relationship between the incidence surface 21*c* and the emission surface 21*d* can be determined, and the optical performance of the second lens 21*q* can be comprehensively evaluated.

Although the optical performance of the reflection surface 25*a* of the see-through mirror 25 alone can be evaluated, the optical performance of the outer surface 25*o* can be evaluated together. In this case, the see-through mirror 25 also has members corresponding to the measurement reference members 16 and 17, similarly to the optical member 10 illustrated in FIG. 1 and the like, and the three-dimensional shapes of the reflection surface 25*a* and the outer surface 25*o* can be measured to determine a relative positional relationship between the surfaces.

With respect to the relative placement of the projection lens 21, the prism mirror 22, the wedge-shaped optical element 23, and the see-through mirror 25, although their relative positional relationship can be measured and evaluated using the measurement reference members provided at each of the optical elements 21, 22, 23, and 25, the disclosure is not limited thereto, and a relative positional relationship of the optical elements 21, 22, 23, and 25, can be measured using measurement reference members for the relative placement determination provided separately for each of the optical elements 21, 22, 23, and 25.

The optical members 10 and 210 of the embodiments described above include a plurality of optically effective surfaces 11*a*, 11*b*, and 11*c*, and include the plurality of measurement reference members 16 and 17 that are associated with the plurality of optically effective surfaces 11*a*, 11*b*, and 11*c* and serve as references for placement of the plurality of optically effective surfaces 11*a*, 11*b*, and 11*c*. In this case, because the plurality of measurement reference members 16 and 17 associated with the plurality of optically effective surfaces 11*a*, 11*b*, and 11*c* may each serve as references for placement of the plurality of optically effective surfaces 11*a*, 11*b*, and 11*c*, a relative positional relationship of the optically effective surfaces 11*a*, 11*b*, and 11*c* can be determined. As a result, the optical performance of the optical members 10 and 210 can be accurately evaluated, and the optical units 100 incorporating the optical members 10 and 210 can be smaller and lighter while maintaining the optical performance.

Modified Examples and Others

Although the disclosure has been described according to the above-described embodiments, the disclosure is not limited to the embodiments, and may be carried out in various modes within a scope not departing from the gist of the disclosure, and, for example, the following modifications may be also be made.

Contour shapes of the optical members 10 and 210 and the shapes of the optically effective surfaces 11*a*, 11*b*, and 11*c* are not limited to those illustrated, and can be changed as appropriate according to the application. A shape of the measurement reference members 16 and 17 is not limited to a triangular pyramid, and can be any of a variety of shapes including flat surfaces or edges.

The optical unit 100 incorporated into the first display device 100*a* is not limited to that illustrated, and may have any of various configurations. For example, the elements constituting the optical unit 100 illustrated in FIG. 11 are merely exemplary, and they can be modified by increasing the number of lenses, adding a mirror, or adding a light guide member.

A light modulation device that modulates light by limiting light transmitted through the combiners 103*a* and 103*b* may be mounted on the outside of the combiners 103*a* and 103*b*. The light modulation device adjusts a transmittance, for example, electrically. Mirror liquid crystals, electronic shades, and the like may be used as the light modulation device. The light modulation device may adjust a transmittance according to outside light illuminance.

The combiners 103*a* and 103*b* can also be replaced with a mirror having light-shielding properties. In this case, a non-see-through optical system that is not premised on direct observation of an external image may be adopted.

The optical member in a specific aspect includes a plurality of optically effective surfaces, and includes a plurality of measurement reference members each of which is associated with a plurality of optically effective surfaces and serves as a reference for positioning of the plurality of optically effective surfaces.

In the optical member, a relative positional relationship of the optically effective surfaces can be determined because the plurality of measurement reference members associated with the plurality of optically effective surfaces each serve as a reference for positioning of the plurality of optically effective surfaces. As a result, the optical performance of the optical member can be accurately evaluated, and the optical unit incorporating the optical member can be smaller and lighter while maintaining the optical performance.

In a specific aspect, the plurality of measurement reference members includes a first measurement reference member and a second measurement reference member, the first measurement reference member includes an overall reference shape corresponding to a datum reference, and the second measurement reference member includes a measurement reference shape different from the overall reference shape. In this case, forming the measurement reference shape in the other measurement reference member associated with the optically effective surface away from the datum reference can relate to measurement of the optically effective surface closer to the datum reference and the optically effective surface away from the datum reference.

In a specific aspect, the overall reference shape includes either a plurality of planes or intersection lines of the plurality of planes. In this case, the datum reference is specified as coordinate information based on the plurality of planes or the intersection lines of the plurality of planes.

In a specific aspect, the measurement reference shape includes either a plurality of planes or intersection lines of the plurality of planes. In this case, an additional reference other than the datum reference is specified as coordinate information based on the plurality of planes or the intersection lines of the plurality of planes.

In a specific aspect, one measurement reference member is formed in a frame provided outside the optically effective surfaces. In this case, the frame outside the optically effective surfaces can be effectively utilized to measure a relative positional relationship.

In a specific aspect, the measurement reference member is provided near the optically effective surfaces to extend continuously from the plurality of optically effective surfaces. In this case, the measurement reference member can be measured collectively with the optically effective surfaces, and the measurement accuracy of the measurement reference member can be increased.

In a specific aspect, the measurement reference member is a protruding portion formed in the frame. In this case, a reference surface or a reference line can be formed on the outer shape of the protrusion, which can facilitate measurement using a measurement device.

In a specific aspect, the optically effective surfaces have an angle of 90° or more between them. In this case, among the plurality of optically effective surfaces, a pair of optically effective surfaces are separated from each other, and it is not easy to measure the surface accuracy collectively with the measurement device, however, a relative positional relationship can be ascertained due to the measurement reference member.

In a specific aspect, the measurement reference member is a common measurement member for the optically effective surfaces. Among the plurality of optically effective surfaces, even if a pair of optically effective surfaces are separated from each other, the common measurement member for the optically effective surfaces can set, and in this case, the common measurement member can be formed in a small space due to a shared use of the common measurement member.

A virtual image display device according to a specific aspect includes an image element that emits image light, and the optical unit that includes the above-described optical member and forms an image with the emitted image light incident from the image element as a virtual image.

In the virtual image display device, the optical unit incorporating the optical member can be smaller and lighter while maintaining the optical performance.

A measurement method for an optical member according to a specific aspect is a measurement method for an optical member including a plurality of optically effective surfaces, in which the optical member has a plurality of measurement reference members that are associated with the plurality of optically effective surfaces and each of which serves as a reference for positioning of the plurality of optically effective surfaces, measures the plurality of measurement reference members associated with the plurality of optically effective surfaces together with the plurality of optically effective surfaces, and determines a relative positional relationship of the plurality of optically effective surfaces by collectively measuring the plurality of measurement reference members separately.

In the measurement method described above, the plurality of measurement reference members associated with the plurality of optically effective surfaces are measured together with the plurality of optically effective surfaces, and the plurality of measurement reference members are collectively measured separately, and thus a relative positional relationship of the optically effective surfaces can be determined while measuring the shapes of the optically effective surfaces. As a result, the optical performance of the optical member can be accurately evaluated, and the imaging optical system incorporating the optical member can be smaller and lighter while maintaining the optical performance.

What is claimed is:

1. An optical member comprising:

a first optically effective surface;

a second optically effective surface; and a wedge-shaped protrusion portion sandwiched between the first optically effective surface and the second optically effective surface;

wherein an optical axis of the first optically effective surface and an optical axis of the second optically effective surface form an angle greater than 90 degrees and less than 180 degrees, and the wedge-shaped protrusion portion includes a first reference surface serving as a reference for positioning the first optically effective surface and a second reference surface serving as a reference for positioning the second optically effective surface, the first reference surface and the second reference surface facing each other and forming an angle greater than 0 degrees and less than 90 degrees.

2. The optical member according to claim 1, wherein the first reference surface includes an overall reference shape corresponding to a datum reference, and the second reference surface includes a measurement reference shape different from the overall reference shape.

3. The optical member according to claim 2, wherein the overall reference shape includes either a plurality of planes or an intersection line of the plurality of planes.

4. The optical member according to claim 2, wherein the measurement reference shape includes either a plurality of planes or an intersection line of the plurality of planes.

5. The optical member according to claim 2, wherein the first reference surface and the second reference surface are formed at a frame provided outside the first optically effective surface and the second optically effective surface.

6. The optical member according to claim 5, wherein the first reference surface and the second reference surface are provided near the first optically effective surface and the second optically effective surface, respectively, so as to extend continuously from the first optically effective surface and the second optically effective surface, respectively.

7. The optical member according to claim 6, wherein the first reference surface and the second reference surface are protruding portions formed at the frame.

8. The optical member according to claim 1, wherein one of the first reference surface and the second reference surface is a common measurement member for the first optically effective surface and the second optically effective surface.

9. A virtual image display device comprising:

an image element configured to emit image light; and an optical unit that includes the optical member according to claim 1, and is configured to form, as a virtual image, an image with the emitted image light incident from the image element.

10. The optical member according to claim 1, wherein a level difference is provided between the first optically effective surface and the first reference surface.

11. The optical member according to claim 1, wherein a level difference is provided between the second optically effective surface and the second reference surface.

* * * * *